United States Patent
Sarda et al.

(10) Patent No.: US 11,012,237 B1
(45) Date of Patent: May 18, 2021

(54) SYSTEMS AND METHODS FOR INTER-SERVICE AUTHENTICATION

(71) Applicant: JPMorgan Chase Bank, N.A., New York, NY (US)

(72) Inventors: Deepak Sarda, Singapore (SG); Ramji Venkateswaran, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 227 days.

(21) Appl. No.: 15/865,355

(22) Filed: Jan. 9, 2018

(51) Int. Cl.
 *H04L 29/06* (2006.01)
 *H04L 9/32* (2006.01)
 *H04L 9/08* (2006.01)

(52) U.S. Cl.
 CPC ............ *H04L 9/3213* (2013.01); *H04L 9/083* (2013.01); *H04L 9/0825* (2013.01); *H04L 9/3226* (2013.01); *H04L 63/0442* (2013.01); *H04L 63/083* (2013.01)

(58) Field of Classification Search
 CPC ..... H04L 9/3213; H04L 9/0825; H04L 9/083; H04L 9/3226; H04L 63/0442; H04L 63/083
 See application file for complete search history.

(56) References Cited

U.S. PATENT DOCUMENTS

| | | | | |
|---|---|---|---|---|
| 9,608,809 B1 * | 3/2017 | Ghetti | ................... | H04L 9/0819 |
| 10,348,702 B1 * | 7/2019 | Sundaram | ............... | H04L 9/083 |
| 10,454,900 B2 * | 10/2019 | Proulx | ................ | H04L 63/0428 |
| 10,735,425 B2 * | 8/2020 | Tran | ........................ | H04L 67/02 |
| 2011/0289310 A1 * | 11/2011 | Selgas | ................... | H04L 9/0894 713/150 |
| 2014/0050317 A1 * | 2/2014 | Sabin | ..................... | H04L 9/0894 380/44 |
| 2015/0186657 A1 * | 7/2015 | Nakhjiri | ................ | H04L 9/0894 713/155 |
| 2018/0123782 A1 * | 5/2018 | Messerges | ............ | H04L 9/0819 |
| 2019/0058594 A1 * | 2/2019 | Kludy | ................... | H04L 9/3249 |

* cited by examiner

*Primary Examiner* — Malcolm Cribbs
*Assistant Examiner* — Stephanie S Ham
(74) *Attorney, Agent, or Firm* — Greenberg Traurig LLP

(57) ABSTRACT

Systems and methods for inter-service authentication are disclosed. In one embodiment, a system may include a plurality of services and a cloud platform. The first service may generate a token comprising a first service identifier for communicating with a second service, and may request, from the cloud platform, a private key for the first service. The cloud platform may provide the private key to the first service. The first service may sign the token with the private key and may communicate a request to the second service with the signed token. The second service may retrieve the first service identifier and may request, from the cloud platform, a public key for the first service identifier. The cloud platform may provide the public key to the second service. The second service may validate the token using the public key, and may grant the request in response to the validation.

19 Claims, 3 Drawing Sheets

SYSTEMS AND METHODS FOR INTER-SERVICE AUTHENTICATION

BACKGROUND OF THE INVENTION

1. Field of the Invention

The present disclosure generally relates to systems and methods for inter-service authentication.

2. Description of the Related Art

A software architecture based on microservices has emerged as a popular design paradigm for applications running in the Cloud. In such an architecture, an application is decomposed into several self-contained services that communicate with each other over the network. While the network communication can be done using various mechanism, communication using the HTTP protocol is the most popular choice.

Due to the service decomposition, what used to be trusted communication between modules now has to traverse the network which is an untrusted domain. Thus, even if two services, Service A and Service B, implicitly trust each other because they are part of the same overall application, the HTTP calls still need to be authenticated.

SUMMARY OF THE INVENTION

Systems and methods for inter-service authentication are disclosed. In one embodiment, a system for inter-service authentication may include a plurality of services and a cloud platform. The first service may generate a token for communicating with a second service, the token comprising a first service identifier, and may request, from the cloud platform, a private key associated with the first service. The cloud platform may provide the private key to the first service. The first service may sign the token with the private key and may communicate a request to the second service with the signed token. The second service may retrieve from the token, the first service identifier and may request, from the cloud platform, a public key associated with the first service identifier. The cloud platform may provide the public key to the second service. The second service may validate the token using the public key, and may grant the request in response to the validation.

In one embodiment, the cloud platform may generate the private key and the public key. In one embodiment, the cloud platform may retrieve the private and public keys from a key vault.

In one embodiment, the cloud platform may assign the identifier to the first service in response to the first service initializing.

In one embodiment, the cloud platform may validate the first service based on the first service identifier. The cloud platform may further validate the first service based on the second service identifier.

In one embodiment, the request from the first service or the second service may be communicated by HTTP.

In one embodiment, the token may be a JSON web token.

According to another embodiment, in an information processing apparatus comprising at least one computer processor, a method for inter-service authentication may include (1) generating a token for communicating with a second service, the token comprising a first service identifier; (2) requesting, from a cloud platform, a private key associated with the first service; (3) receiving the private key associated with the first service from the cloud platform; (4) signing the token with the private key associated with the first service; (5) communicating a request to the second service with the signed token; and (6) receiving authorization from the second service to communicate with the first service.

In one embodiment, the cloud platform may generate the private key and the public key.

In one embodiment, the cloud platform may retrieve the private and public keys from a key vault.

In one embodiment, the cloud platform may validate the first service based on the first service identifier.

In one embodiment, the request may be communicated by HTTP.

In one embodiment, the token may be a JSON web token.

According to another embodiment, a system for inter-service authentication may include a plurality of services and a cloud platform. A first service may request a public key associated with a second service from a cloud platform. The cloud platform may provide the public key associated with the second service to the first service. The first service may encrypt a message to the second service with the public key associated with the second service, and may communicate the encrypted message to the second service. The second service may request, from the cloud platform, a private key associated with the second service. The cloud platform may provide the private key for the second service to the second service, and the second service may decrypt the encrypted message using the private key associated with the second service.

In one embodiment, the cloud platform may validate the first service before providing the public key for the second service to the first service.

In one embodiment, the request from the first service may include a service identifier for the first service. The request from the first service may also include a service identifier for the second service. The cloud platform may validate the second service before providing the private key for the second service to the second service.

In one embodiment, the request from the second service may include a service identifier for the second service.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein relate to systems and methods for inter-service authentication.

Embodiments disclosed herein may use a token, such as a JSON Web Token based on the JSON Web Token Specification (RFC7519), to authenticate one service to another leveraging the trust based on the services' relationship with a cloud platform. For example, with Cloud Platforms, the platform infrastructure controls how and where services are launched. The platform controller knows where each and every service that it is managing is running. In other words, the platform controller can link a service's identity to where the service is running.

In one embodiment, the token may be signed with a first party's private key, and validated by the second party using the first party's public key.

In embodiments, not all service-to-service communications are encrypted. For example, it may be too computationally-expensive to encrypt all communications, or there may be a need to analyze some parts of the message (e.g., for audit/tracking/visibility/etc.). In such scenarios, Service-to-Service communication may be, for example, over unencrypted HTTP, but the message content may be either partially (e.g., some sensitive fields) or fully (e.g., entire message body) encrypted using the disclosed key distribution.

Figure 1:
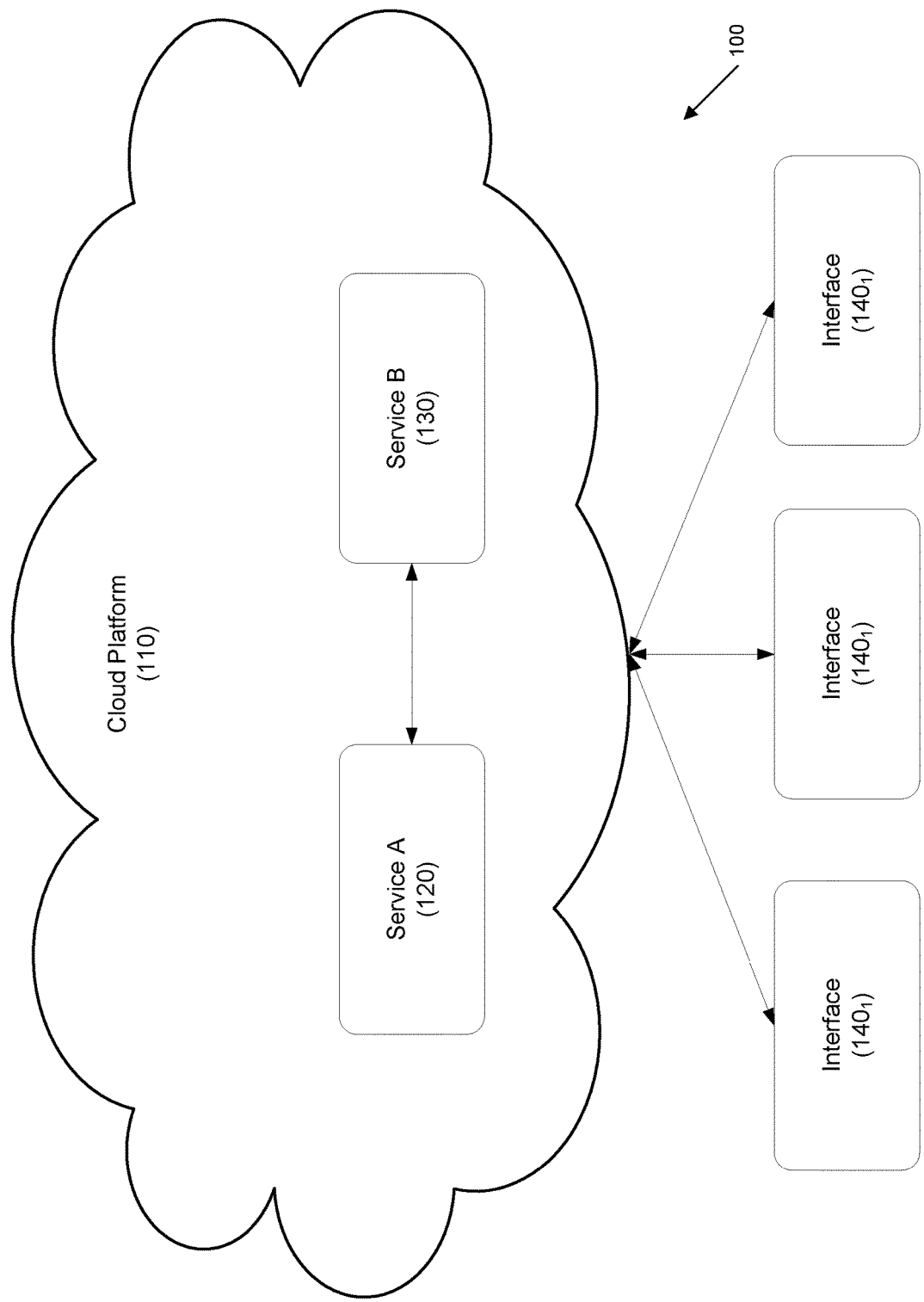
FIG. 1 depicts a diagram of a system for inter-service authentication according to one embodiment.

Referring to FIG. 1, a system for inter-service authentication is disclosed according to one embodiment. System 100 may include cloud platform 110, which may be any suitable cloud platform. Examples of such a suitable cloud platform is the Amazon Web Service (AWS) cloud platform, the Microsoft Azure cloud platform, Google Cloud Platform, etc. Other cloud services, including public and private, may be used as is necessary and/or desired.

In one embodiment, cloud platform 110 may provide storage for secrets, such as public/private keys, certificates, etc. It may further facilitate the retrieval of those based on the trusted relationship. The tokens may then be generated and/or validated using the retrieved keys.

Services, such as Service A 120 and service B 130 may be provided. Although only two services are depicted in FIG. 1, it should be recognized that additional services may be provided as is necessary and/or desired.

In one embodiment, the services 120 and 130 may be part of a larger program, etc. As an illustrative example in the context of an online merchant, one service could be an order management service, a second service could be a Validation Service that validates orders and returns a success/fail response, and a third service could be an inventory check service, etc.

In one embodiment, services 120 and 130 may communicate with each other, and with cloud platform 110, using any suitable protocol, including HTTP, HTTPS, etc. Other examples include binary protocols (e.g., protobuf, thrift, etc.) that may work with synchronous protocols (e.g., http/https) and asynchronous protocols (e.g., AMQP).

Interfaces 140 may be provided and may interface with cloud platform 110. In one embodiment, interfaces 140 may interface using, for example, one or more API (not shown).

Figure 2:
FIG. 2 depicts a method for inter-service authentication according to one embodiment.

Referring to FIG. 2, a method for inter-service authentication is disclosed according to one embodiment. In one embodiment, upon start-up, each service may be assigned a unique service ID by, for example, the cloud platform.

In step 205, a service used within a cloud platform may create a token, such as a JSON web token. In one embodiment, the JSON web token may include a header and a payload. The header may include fields such as the cloud platform assigned service id, the signing algorithm, etc. The payload may include, for example, the token issuer, a token audience, an issuing timestamp, and an expiry timestamp. Additional or fewer fields may be provided as is necessary and/or desired.

Next, in step 210, Service A may fetch its private key from the cloud provider using its assigned service ID. In one embodiment, Service A may provide its service ID; in another embodiment, the Cloud platform may identify Service A by any other suitable means.

In one embodiment, if a service is fetching a private key, the Platform may validate that the service id in the request is indeed the service id of the requestor (e.g., Service A is the one making the request for the private key). On the other hand, if the service is fetching a public key, then the service id may be for a different service.

In one embodiment, the communication may be by HTTP.

In step 215, the cloud platform may validate Service A based on the assigned service ID. In one embodiment, the cloud platform may consider one or more property of Service A to validate Service A. For example, the process id mapping, the event history API of the cloud platform, etc. may be considered in making the validation.

In step 220, the cloud platform may return the private key associated with the assigned service ID. If a key is not associated with the service ID, the cloud platform may generate a private and public key for the service ID, and may provide the private key to Service A.

In one embodiment, the cloud platform may maintain keys for its registered services in, for example, a key vault.

In step 225, Service A may receive the private key and may sign the token with the private key provided by the cloud platform.

In step 230, Service A may send a request with the signed token to Service B. This may be communicated using, for example, HTTP.

In step 235, Service B may receive Service A's request and may retrieve Service A's service ID from a field in the token.

In step 240, Service B may request the public key associated with Service A's service ID from the Cloud platform. In one embodiment, Service B may provide its service ID to the Cloud platform; in another embodiment, the Cloud platform may retrieve the service ID for Service B through other means.

In one embodiment, Service B may also provide Service A's service ID so that the cloud platform may optionally validate that Service B is permitted to retrieve the public key, and to fetch the public key for Service A.

In step 245, the cloud platform may validate Service B and may provide the public key associated with the service ID for Service A to Service B.

In step 250, Service B may verify the integrity of the token using the public key, and may grant access to Service A if the token is valid.

In one embodiment, since the public/private keys are linked to a unique ID for the service and will not change over time, one or both of the services may cache keys that are provided by the cloud platform. Thus, token generation and verification can be done within the services without making expensive calls to an authorization server.

In one embodiment, instead of keys, certificates or any other suitable security device, protocol, etc. may be used as is necessary and/or desired. For example, X.509 certificates may be used.

Figure 3:
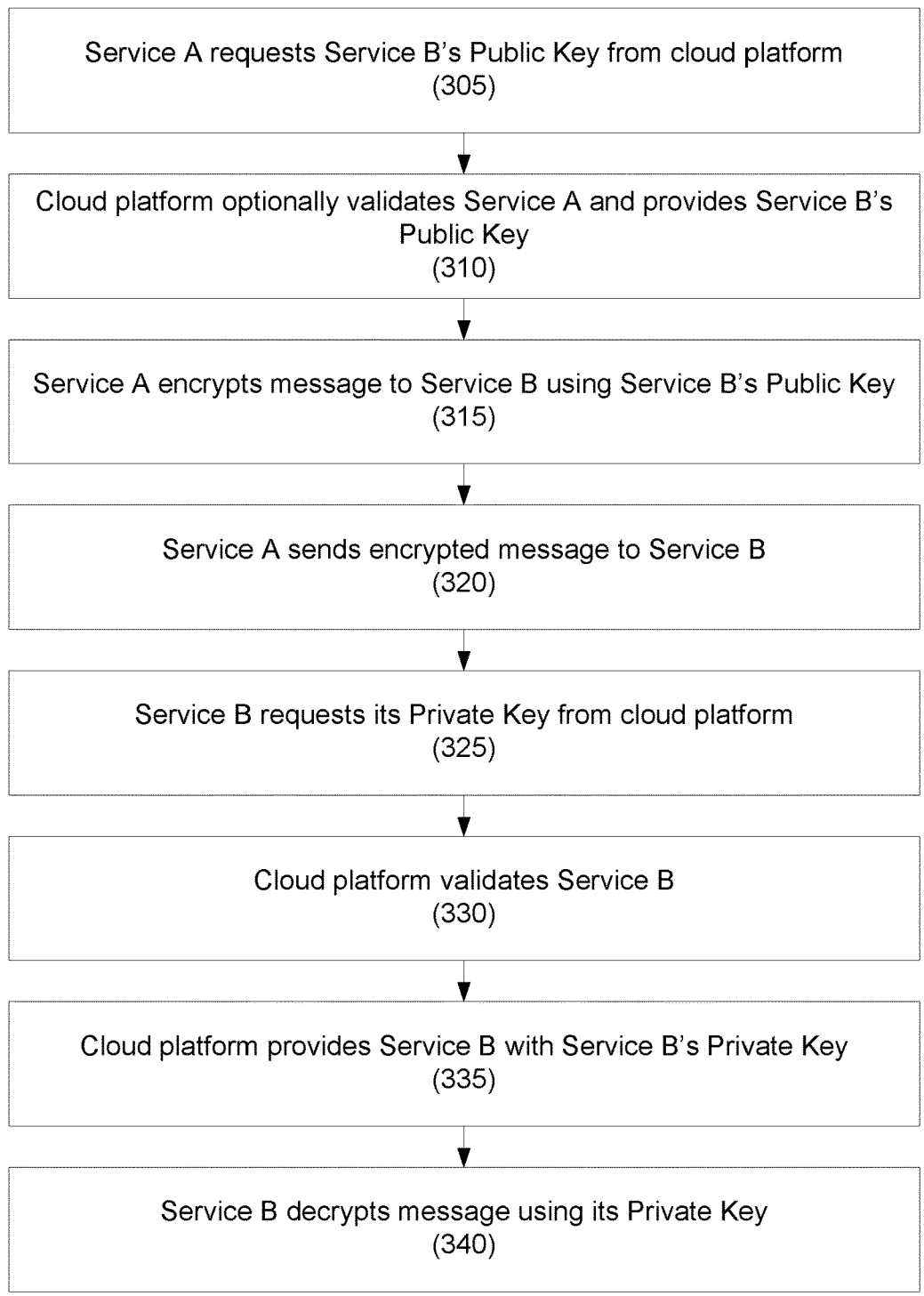
FIG. 3 depicts a method for inter-service authentication according to one embodiment.

Referring to FIG. 3, In another embodiment, a method of light-weight encryption is provided.

In step 305, Service A may request Service B's public key from a cloud platform.

In step 310, the cloud platform may optionally validate Service A and may then provide Service B's public key.

In step 315, Service A may encrypt a message to Service B using Service B's public key.

In step 320, Service A may send the encrypted message to Service B, and service B may receive the encrypted message.

In step 325, after receiving the encrypted message, Service B may request its private key from the cloud platform.

In step 330, the cloud platform may validate Service B in any suitable manner. For example, Service B may provide its ID as discussed above.

In step 335, the cloud platform may provide Service B with its private key, and in step 340, Service B may decrypt the message using its private key.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a cardholder or cardholders of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "cardholder interfaces" may be utilized to allow a cardholder to interface with the processing machine or machines that are used to implement the invention. As used herein, a cardholder interface includes any hardware, software, or combination of hardware and software used by the processing machine that allows a cardholder to interact with the processing machine. A cardholder interface may be in the form of a dialogue screen for example. A cardholder interface may also include any of a mouse, touch screen, keyboard, keypad, voice reader, voice recognizer, dialogue screen, menu box, list, checkbox, toggle switch, a pushbutton or any other device that allows a cardholder to receive information regarding the operation of the processing machine as it processes a set of instructions and/or provides the processing machine with information. Accordingly, the cardholder interface is any device that provides communication between a cardholder and a processing machine. The information provided by the cardholder to the processing machine through the cardholder interface may be in the form of a command, a selection of data, or some other input, for example.

As discussed above, a cardholder interface is utilized by the processing machine that performs a set of instructions such that the processing machine processes data for a cardholder. The cardholder interface is typically used by the processing machine for interacting with a cardholder either to convey information or receive information from the cardholder. However, it should be appreciated that in accordance with some embodiments of the system and method of the invention, it is not necessary that a human cardholder actually interact with a cardholder interface used by the processing machine of the invention. Rather, it is also contemplated that the cardholder interface of the invention might interact, i.e., convey and receive information, with another processing machine, rather than a human cardholder. Accordingly, the other processing machine might be characterized as a cardholder. Further, it is contemplated that a cardholder interface utilized in the system and method of the invention may interact partially with another processing machine or processing machines, while also interacting partially with a human cardholder.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for inter-service authentication comprising:
a cloud platform; and
a plurality of services hosted within the cloud platform, each service executed by at least one computer processor;
wherein:
a first service generates a token for communicating with a second service, the token comprising a first service identifier;
the first service requests, from the cloud platform, a private key associated with the first service;
the cloud platform provides the private key to the first service, wherein the cloud platform validates that the first service is requesting the private key based on the first service identifier before providing the private key;
the first service signs the token with the private key;
the first service communicates a request to the second service with the signed token;
the second service retrieves from the token, the first service identifier;
the second service requests, from the cloud platform, a public key associated with the first service identifier;

the cloud platform provides the public key to the second service in response to validating that the second service is permitted to receive the public key associated with the first service identifier, wherein the second service provides the first service identifier and a second service identifier of the second service to the cloud platform to receive the public key;

the second service validates the token using the public key; and the second service grants the request in response to the validation.

2. The system of claim 1, wherein the cloud platform generates the private key and the public key.

3. The system of claim 1, wherein the cloud platform retrieves the private and public keys from a key vault.

4. The system of claim 1, wherein the cloud platform assigns the first service identifier to the first service in response to the first service initializing.

5. The system of claim 1, wherein the cloud platform further validates the first service based on the second service identifier.

6. The system of claim 1, wherein the request is communicated by HTTP.

7. The system of claim 1, wherein the token comprises a JSON web token.

8. A method for inter-service authentication comprising:

in a cloud platform information processing apparatus comprising at least one computer processor and hosting a first service and a second service:

generating a token for communicating with the second service, the token comprising a first service identifier;

requesting, from the cloud platform, a private key associated with the first service;

receiving the private key associated with the first service from the cloud platform, wherein the cloud platform validates that the first service is requesting the private key based on the first service identifier before providing the private key;

signing the token with the private key associated with the first service;

communicating a request to the second service with the signed token, wherein the second service receives a public key associated with the first service in response to validating that the second service is permitted to receive the public key, wherein the second service provides the first service identifier and a second service identifier of the second service to the cloud platform to receive the public key; and receiving authorization from the second service to communicate with the first service.

9. The method of claim 8, wherein the cloud platform generates the private key and a public key.

10. The method of claim 8, wherein the cloud platform retrieves the private key and a public key from a key vault.

11. The method of claim 8, wherein the request is communicated by HTTP.

12. The method of claim 8, wherein the token comprises a JSON web token.

13. A system for inter-service authentication comprising:

a cloud platform; and a plurality of services hosted within the cloud platform, each service executed by at least one computer processor;

wherein:

a first service requests a public key associated with a second service from a cloud platform;

the cloud platform provides the public key associated with the second service to the first service;

the first service encrypts a service request to the second service with the public key associated with the second service;

the first service communicates the encrypted service request to the second service;

the second service requests, from the cloud platform, a private key associated with the second service;

the cloud platform provides the private key for the second service to the second service, wherein the cloud platform validates the second service before providing the private key, wherein the cloud platform validates the second service by receiving, from the second service, a first service identifier for the first service and a second service identifier for the second service in order to provide the private key; and the second service decrypts the encrypted service request using the private key associated with the second service.

14. The system of claim 13, wherein the cloud platform validates the first service before providing the public key for the second service to the first service.

15. The system of claim 14, wherein the request from the first service comprises a service identifier for the first service.

16. The system of claim 15, wherein the request from the first service further comprises a service identifier for the second service.

17. The system of claim 13, wherein the request from the second service comprises a service identifier for the second service.

18. The system of claim 1, wherein the first service and second service are registered with the cloud platform.

19. The system of claim 1, wherein the first service identifier and the second service identifier are assigned by the cloud platform.

* * * * *